(12) United States Patent
Chien (10) Patent No.: US 8,231,260 B2
(45) Date of Patent: Jul. 31, 2012

(54) LED LIGHT HAS PINHOLE IMAGING

(76) Inventor: Tseng-Lu Chien, Walnut, CA (US)

( * ) Notice: Subject to any disclaimer, the term of this patent is extended or adjusted under 35 U.S.C. 154(b) by 0 days.

(21) Appl. No.: 13/019,331

(22) Filed: Feb. 2, 2011

(65) Prior Publication Data

US 2011/0164415 A1      Jul. 7, 2011

Related U.S. Application Data

(62) Division of application No. 12/318,471, filed on Dec. 30, 2008, now Pat. No. 8,002,456.

(51) Int. Cl.
*H01R 33/00* (2006.01)

(52) U.S. Cl. ........ 362/640; 362/641; 362/644; 362/646; 362/311.03

(58) Field of Classification Search ............ 362/31, 362/311, 13, 311.14, 311.02, 640, 641, 644, 362/646
See application file for complete search history.

(56) References Cited

U.S. PATENT DOCUMENTS

| | | | |
|---|---|---|---|
| 5,772,314 A | 6/1998 | Brumer | |
| 6,888,323 B1 * | 5/2005 | Null et al. | 315/294 |
| 7,201,508 B2 | 4/2007 | Misaras | |
| 8,002,456 B2 * | 8/2011 | Chien | 362/640 |
| 8,128,274 B2 * | 3/2012 | Chien | 362/641 |
| 2003/0206410 A1 | 11/2003 | Parsons et al. | |

* cited by examiner

*Primary Examiner* — Anabel Ton
(74) *Attorney, Agent, or Firm* — Bacon & Thomas, PLLC

(57) ABSTRACT

An LED light has a pinhole-imaging function for dark area use as a plug-in wall outlet light, direct current (DC) operated light, or interchangeable power source light to project a shaped image to a surrounding environment. Tiny shaped pinholes can create a fine image of desired message, data, logo, or time on a ceiling, walls, floor, optics means surface or other desired surface. At least one pinhole-means may be incorporated with an LED and parts selected from a housing-member, plastic film openings, cut-outs, transparent material piece, translucent material piece, adjust-means, sealed-unit, battery-pack, paper material, plastic material, metal material, wood material, geometric shape substrate, AC adaptor and jack means, and/or solar power or wind power generator to project the desired image, message, data, logo, to the surrounding environment, which may include any combination of ceiling, walls, floor, or other desired surfaces(s). The light may have an adjustable feature, interchangeable power source feature, dot-matrix geometric shape feature, and features to change position or orientation of the pinhole substrate or LED.

10 Claims, 10 Drawing Sheets

Fig 5-1

Light source and hole fixed.
=> screen distance more away from hole, image bigger.

Fig 5-2 hole and screen distance fixed
=> light source more away from hole, Image bigger.

Fig 5-3 hole and screen fixed
=> middle object more close hole, Image bigger.

Fig 5

Candle pass though the hole will have image on the screen is reverse image. size depend on the distance of cancle to the hole.

Fig 6

Physics Pin-Hole Image theory

Hole bigger-->Image not clear

Fig 7-1

Medium hole-->Image bad

Fig 7-2

Bigger hole-->Image not readble

Fig 7-3

Source away-->Image smaller

Fig 7-4

Source closer-->bigger image

Co-Pending File
Fig 7-8
Geometric shaped pin-holes on cover for plastic, metal, paper, or market avaialable material Co-Pending File
Fig 7-9
Geometric pin-holes on desired material sheet such as metal sheet by stamping process on position with matching covers for desire light.

Co-Pending File
Fig 7-10
Geometric shaped pin-holes on abstrate and position on desired position for best effect.

Fig 7-11

For Pin-hole projection only can have one light souce at one time to prevent from the multiple images or diffusion effects. The above drawing for special purpose such as internal with many divided spaces to project its own image Fig 7
metal sheet cover
7a, 7b, 7d, 7c, 7e Fig 8
8d1, 8d2, 8d3, 8d4, 8e Fig 9
plastic or paper or desire sheet with pinhole
9a, 9d, 9d1, 9b, 9c, 9e Fig 10
10d1, 10d2, 10b, 10d1, 10c Fig 11
Pinholes on the plastic sheet which may has laser feature on sheet
11d1, 11d2, 11d3, 11d4, 11b, 11e Fig. 12
12d1, 12d2, 12d3, 12b, 12d4, 12e Fig 13
Pin-holes on pre-designed sheet with most economic tool and process to make to get designed colorful cover
13d1, 13d2, 13b, 13c Fig 14
14d1, 14d2, 14d3, 14d5, 14b, 14d4, 14e All above drawing Co-Pending File

LED LIGHT HAS PINHOLE IMAGING

This application is a continuation of U.S. patent application Ser. No. 12/318,471, filed Dec. 6, 2010, and incorporated by reference herein.

BACKGROUND OF THE INVENTION

This application has subject matter in common with U.S. patent application Ser. Nos. 12/318,470 ("LED projection night light"); 12/149,163 ("Removable LED light device"); 12/073,889 ("LED track light device); 12/073,095 ("LED light with changeable position with Prefereable power source"); 12/007,076 ("LED light with changeable geometric system"); 12/003,691 ("LED light with changeable geometric dimension features"); 12/003,809 ("LED light with changeable features"); 11/806,711 ("Multiple LED light with adjustable angle features"); 11/527,631 ("LED Night light with interchangeable display unit"); 11/498,881 ("Poly Night light"); 11/255,981 ("Multiple light source Night Light"); 11/094,215 ("LED Night light with Liquid optics medium"); ("Night light with fiber optics)"; ("Fiber Optic light kits for footwear"); 11/498,874 ("Illumination for LED night light"); 11/527,629 ("Time Piece with LED night light"); 11/527,628 ("Multiple Function Night light with Air Freshener"); 11/806,284 ("LED Night light with more than one optics mediums"); 11/806,285 ("LED Night Light with multiple function"); and 11/806,711 ("Multiple LEDs Light with adjustable angle function").

The invention relates to an LED light having pinhole-imaging means for projecting a desire image on a wall, ceiling, floor, desired surface, or desired location to enable people to view the desired image. The desired image may include a star(s), moon, planet, silver-river, universal image, cartoon character, family photos, or other favorite image to create a pleasurable mood when people are in a dark environment or trying to fall asleep. It is especially important for youth or kids to let them have their own favorite image surround them when in their room.

The current invention has the following features:

1. The current invention may incorporate a simple optics-assembly to obtain the pinhole-imaging features using just one LED and one pinhole-unit, and a related power source, circuit, and trigger means for causing the LED(s) to turn on and turn off according to predetermined functions, duration, and effects.

2. The invention may incorporate an LED position adjust-means that can change image position, location, size, brightness, and related image specifications.

3. The current invention has no hazardous material such as a glass lens, no hinge box with projector means inside, and no need to precisely position a variety of lenses.

4. The current invention may incorporate an adjustable-means to adjust the distance between a pinhole-unit and LED to get a desire image quality in any of a variety of indoor spaces.

5. The current invention's pinhole imaging will project into three dimensions depending on the pinhole-unit's surface pinhole arrangement. As long as a pinhole exists on the pinhole-unit's surface, the LED light beam will pass through it and form an image on a surface that is perpendicular to the light beam emitting direction.

6. The night light of the current invention can fit a majority of market-available housings so as to provide an acceptable appearance, size, and shape and meet U.S. safety standard requirements while using an alternating (AC) current power source. It also can powered by a direct current (DC) power source such as batteries or rechargeable batteries that may be connected with an AC adaptor, transformer, solar power, wind power, or generator to recharge the rechargeable batteries.

7. The night light of the current invention may have an adjustable distance between the LED and the pinhole-unit to provide a clear image on any desired surface(s).

8. The night light of the current invention may have an alternative arrangement for battery position, location, or orientation to allow the LED's light beams to have the best position to pass though the pinholes and get the best light effects and performance to meet viewer's requirements.

9. The night light of the current invention may have a spiral arrangement for batteries so the LED may be put near center locations and emit light as close to an edge as possible, which will create more pinhole-imaging to cover wider areas of all walls and thereby provide the best light performance and image size.

10. The LED light of the current invention has a super low cost for the pinhole-unit, which can made of paper, a metal piece, a plastic sheet, a blister sheet, or wood.

11. In the current invention, the pinhole size is preferably between 0.1 mm and 50 mm (+/−50%) with any geometric shape.

12. The current invention preferably uses an LED with a wide viewing angle to cover a wider area with pinhole-imaging performance for indoor use on all walls and ceilings.

13. A preferred LED for the current invention is a blue color LED; next preferred is a green color LED; next preferred is a white color LED; and least preferred is a red color LED.

14. The current invention the number of LEDs is preferably just ONE because illumination of more than one LED at a time will result in a double ghost image, which may make a viewer's eye very uncomfortable. It is within the scope of the invention to provide a plurality of LEDs or color changing LEDs, but only ONE LED should emit the light at any time to prevent the double or ghost image from occurring.

15. The basic pinhole imaging theory utilized by the LED, pinhole-unit, and housing member arrangement of the current invention is illustrated in FIGS. (5) (5-1) (5-2) (5-3), FIG. (6), and FIGS. (7-1)(7-2)(7-2)(7-4).

Figure 12:
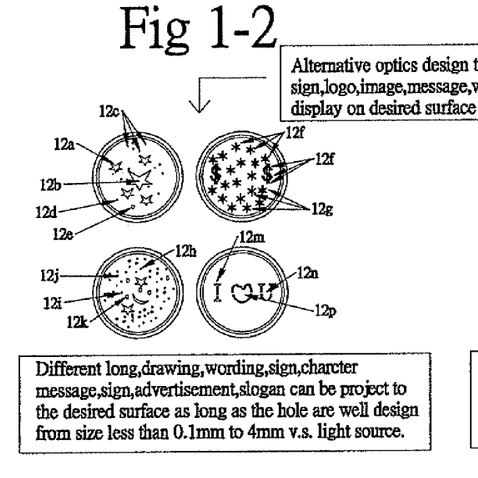

16. The current invention also provides a method to project a special logo, design, artwork, word, message, sign, or advertisement by using tiny pinholes whose size should be between 0.1 mm and 2.5 mm in diameter (+/−50%) which is similar To a Dot-Matrix arrangement that uses a plurality of small pinholes to form a single message such as the one shown in FIG. 1-2 (12m) (12n), in which "I" and "U" are made of possibly 50 tiny pinholes to provide clear pinhole-imaging on a ceiling or walls.

This plurality of tiny pinholes, dot-matrix like arrangement will create all kinds of message, logo, or art to meet a wide variety of market requirements.

17. The current invention provides a perfect design for an LED light which has no switch visible on the unit because any switch means is already electric connected with one part of the housing-member so that a user need only touch a special housing-member to trigger the electric system for illumination and provide a predetermined light function, timing, duration, and effects.

18. The current invention may use a unique interchangeable power source construction (as shown FIG. 2, FIG. 3, FIG. 7-8, FIG. 7-9) that includes a sealed-unit and battery-pack for the LED light. The sealed-unit is known from the inventor's copending applications listed above. The "sealed-unit" has all electric components, including a prong, circuit, trigger means, LED or LED connector sealed within to provide AC power source to turn on and turn off the said LEDs. The "sealed-unit" also can be replaced by a battery-pack which has all electric components within, including batteries, a circuit, trigger means, and LED or LED connectors to provide DC power for night light illumination according to predetermined functions, timing, duration, and effects. A suitable "sealed unit" is shown for example in FIG. S of the following copending applications:

(1) U.S. patent application Ser. No. 11/527,631, LED Night light with interchangeable display unit.
(2) U.S. patent application Ser. No. 11/498,881, Poly Night light.
(3) U.S. patent application Ser. No. 11/255,981, Multiple light source Night Light.
(4) U.S. patent application Ser. No. 11/094,215, LED Night light with Liquid optics medium Ser. No. 11/094,215.

19. The current invention may include a spherical ball having rotating means to change the position of the ball and thereby change the image. The sphere has different shaped pinholes on each half ball to change the image while rotating ball as desired. For example, multiple differently-shaped pinholes may be provided at certain areas of the ball's substrate such as at 60 degree intervals (6 areas), 90 degree intervals (4 areas), or 180 degree intervals (2 areas such as in FIG. 3) so that adjust-means or rotating-means can be used to rotate the ball to so allow people to select a variety of different images from one LED light.

The current invention results in a big improvement over all prior art, including the following US patents:

U.S. Pat. No. 5,517,264 (Sutton) discloses a projection night light preferably including a 7 Watt bulb (408). Because the bulb outputs too much heat, a big distance from the bulb to the optics means is required and one needs to use glass material, which is a very big danger to the user. Furthermore, Sutton uses a glass reflection lens (604) to cause the image to be seen on the display screen (102), which is a too complicated construction and not practical for low cost application. In addition, the glass lens is much too fragile glass lens and also too heavy for prongs of a night light to stay tightly in an outlet.

U.S. Pat. No. 7,267,444 (Black, Jr.) discloses a projection night light which has similar problems to Sutton, such as use of too many lenses, including (303) a reflector mirror, (105) (405) a condensing is, (106) (406) an adjust lens, (403) a grating lens corresponding to one disclosed in the current inventor's U.S. Pat. No. 5,667,736, and (415) a projection/object lens. Some of these lenses need to made of a glass material that is very fragile and will be broken because the assembly is too heavy to hold tight on an outlet. The Black patent also emphasizes that the night light projects the image onto a surface that is parallel to a path of the light beam, which means on the top of night light's wall. This is one reason why Black needs a lot of special optical lenses situated between glass lenses (109) (209) (309) (409).

Other prior art includes:
U.S. Pat. No. 6,824,296—Souze et al—Rotating lens with Bulb (78)
U.S. Pat. No. 6,889,918—Yaniv—Projector that is wearable and projects an image on a screen (12).
U.S. Pat. No. 7,329,035—Feliciano—Child Night Light to be held or worn.
U.S. Pat. No. 7,438,446—McCann—Projector inside (20) a hinged top box (this arrangement cannot pass USA safety standards because it cannot pass weight and pulling tests).

The current invention LED light for night time use including (A) a plug-in wall outlet night light or (B) a direct current operated night light, with projection features to project an image, message, data, logo, or time onto a ceiling, walls, floor, optics means surface or any other desired surface to be seen by a viewer.

The current invention has a light source in the form of an LED or plurality of LEDs (which may be the same as disclosed in copending U.S. patent application Ser. No. 11/255,981, now allowed) to supply visible light beams to an optics means or more than one optics means (as disclosed in copending U.S. patent application Ser. No. 11/806,284) and create an image to be projected onto a desired surface or location with additional features that may be selected from the group consisting of size, dimension, area, height, distance, color, brightness, time period, trigger means, light function, light performance, changeable focus, changeable slides, changeable geometric shape of the night light, and changeable projection head direction.

The current invention may incorporate optics means such as an optics-lens, concave lens, openings, cut-outs, film, grating means, hologram means (such as the hologram means disclosed in the inventor's U.S. Pat. No. 5,667,736) to create a preferred image onto a desired location or surface to be seen by a viewer.

The current invention combines features disclosed in the inventor's copending U.S. patent application Ser. Nos. 11/255,981 and 11/806,284 for more than one light source and optics means with features disclosed in the inventor's U.S. Pat. No. 5,667,736 for a grating or hologram to create a lot of images and get a best image projection on a wall, ceiling, floor, or surface of the optics means.

BRIEF DESCRIPTION OF THE DRAWINGS

FIG. 1 shows a first preferred embodiment of the invention, which has a plurality of pinholes on the cover.

FIG. 1-2 illustrates a variety of pinhole designs, which not only shows the pinhole cutout shape but also can present a desired logo, art, word, message, display, sign, advertisement, seasonal wording, or sentence by using tiny pinholes to arranged in a shape that shows the message, logo, character, word, display, sign . . . etc.

FIG. 1-3 illustrates use of a plurality of tiny shaped pinholes to make a word, message, seasonal wording, logo, or advertisement on a cover to cause pinhole-imaging on desired surfaces.

FIGS. 2, 2-1, 3, and 4 show second, third, and fourth preferred embodiments of a plug-in night light which may incorporate the "sealed-unit" and "battery pack" disclosed in the above-cited copending applications to provide an LED light with interchangeable AC and DC power sources that can be interchanged to utilize AC or DC power as needed. The pinholes on different housing-members enable different sized areas to be illuminated by attractively shaped images (such as stars and a moon).

FIGS. 5, 5-1, 5-2, 5-3, 6, 7-1, 7-2, 7-3, and FIG. 7-4 show basic principles of pinhole-imaging, including the manner in which relationships between the LED and shaped pinholes affect image attributes including size, brightness, distance etc.

FIGS. 7-5 and 7-11 show a preferred LED arrangement for the LED light. As discussed earlier, pinhole-imaging applications only can use ONE light source at any time to prevent double or ghost images. A plurality of LEDs are shown because some applications require different color LEDs so FIG. 7-5 show all these alternative arrangements.

FIGS. 7-6 and 7-7 show different adjust-means to change the distance between the pinholes and light means, and a preferred LED and power source arrangement for an alternative method.

FIGS. 7-8, 7-9, and 7-10 show different substrate materials for pinholes, which may be selected from paper, plastic, metal, wood, blister or other materials available from the market to easily get tiny pinholes on its surface and a desired geometric shape to become a finished product. These figures also disclose interchangeable AC and DC power sources to change from DC to AC or AC to DC. Also shown is the effect of the LED light beam path and pinhole-imaging on the projected image area.

FIGS. 7 to 16 show all kinds of shaped pinhole arrangements on different material substrates for a cover or wall of the first preferred embodiment. The invention can also use a paper or plastic pinhole-film installed at a desired location on a transparent housing-member to show the image on a surrounding environment, area, or surface.

DETAILED DESCRIPTION OF THE PREFERRED EMBODIMENTS

The current invention involves an LED light having a pinhole-imaging function that can project an image. As will become apparent from the following description, it is different from a conventional projection pen, key chain, toy, or commercial presentation projection equipment, and is simpler to use than the conventional chemically coated glowstars that need to be glued on a ceiling and walls.

The current invention incorporates an LED or LEDs as the light source to emit power saving light beams that pass through a plurality of tiny shaped pinholes to provide a larger image on a surrounding environment including any combination of a wall, ceiling, floor, or desired surface(s).

The current invention may take the form of a direct current (DC) operated light which is arranged to turn on the LED or LEDs by pushing or touching a housing of the light. This push or touch operation is the same as in a conventional puck or tap light, but the current invention also provides big improvements by adding an optics design for the opaque-lens or translucent-lens of the conventional punk light to not only supply illumination but also to project a plurality of preferably shaped images on the surrounding environment.

The current invention may incorporate optics-means and other elements selected from a housing-member, plastic film, openings, cut-outs, transparent material piece, translucent material piece, adjust-means, sealed-unit, battery-pack, paper material, plastic material, metal material, wood material, geometric shape substrate, AC adaptor and jack means, solar power source, wind power source, and generator to project the desired image, message, data, or logo, on any surrounding environment including any combination of a ceiling, walls, floor, or other desired surfaces(s).

The current invention also may involve the geometric design for the whole LED light, which is not limited to that of the preferred embodiments. Alternative constructions for the LED light with different geometric shapes, and which may be extendable, rotating, position changeable, distance adjustable, and/or have different pinhole diameters, will still fall within the current invention scope.

FIG. 1 shows an LED light (1) with pinhole-imaging function that has a cover (1a) including a plurality of pinholes shaped, for example, as a moon (1c), stars (1c) (1d) (1f) (1g), (1k), (1m) and planets (1h) (1i) (1j) (1n) (1p) (1q) (1r), and in which an inner LED light beam will pass through all of the pinholes to create the shaped image on a surrounding environment, including ceiling, walls, or any other desired surface(s). The LED can be any color and any number incorporated with an integrated circuit (IC) to work with a switch means such that each time the housing-member is touched, the LED will change its state. The LED state may be selected from the group including fade in and fade out, chasing, random, auto-changing color, and change to a next color. An upgraded model may add a timer to turn off the LED after a period of time. Some models may need a motion sensor or other trigger means which may be selected from a mechanical or electrical device available from the marketplace, any of which may still fall within scope of the current invention.

Figure 13:
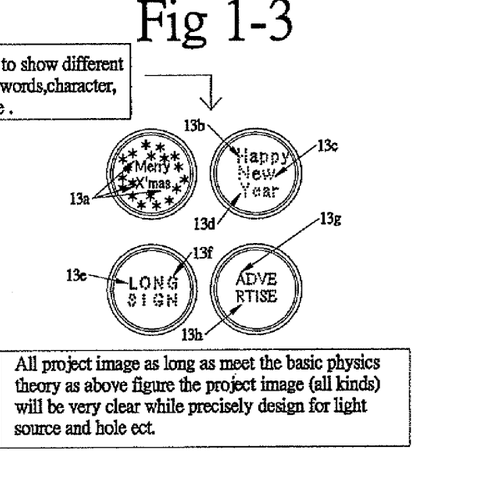

FIGS. 1-2 and 1-3 teach how to make a certain message, logo, character, cartoon image, artwork, seasonal wording, nice word, religion image, words, advertisement, or sign by using a plurality of tiny pinholes to form the contour of the above mentioned art, design, words, shape, drawing, or geometric configuration. It is very similar to the way a conventional LED dot matrix is used to make a word, display, art, or design. However, to use tiny pinholes to form the contour of the any detailed geometric shape, one needs to use very tiny pinholes which should be less than 3 mm+/−50%; the smaller the better. Each geometric shape uses as tiny and as many pinholes as possible to enable the image to be easily recognized and readable by viewer. The preferred pinhole size (<3 mm+/−50%) is for a small room application. If the application is for a big space, the tiny pinholes can be enlarged to be much bigger.

The pinhole-imaging of the invention will follow the optics theory illustrated in FIGS. (5), (5-1), (5-2), (5-3), (6), (7-1), (7-2), and (7-4). Any optics invention from 1900 to up date must use the same physical theory which has been around for centuries. As with all prior art, the inventor has simply applied the physical theory to the real world. The current invention applies the pinhole-imaging theory in a unique way to a battery operated puck light or AC powered puck light. It provides a big improvement over the current ugly puck light that only has illumination function rather than the more practical pinhole-imaging to help people of all ages calm down their mind without going outdoors to see twinkling stars and the moon during a snowy winter night or hot summer night.

Figure 2:
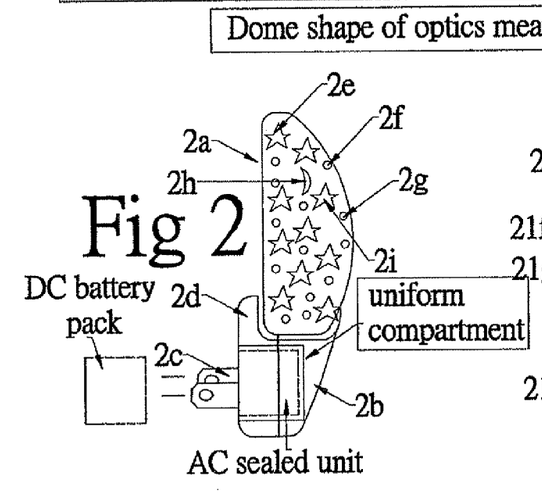

FIG. 2 a second preferred embodiment which includes a prong means (2c) to connect with a wall outlet AC power source and inner circuit means for converting the 110 Volt 60 HZ electric signal into an LED trigger signal. At least one trigger means incorporated with the circuit-means may be selected from the group consisting of sensor-means, switch-means, timer-means, and IC-means so as to turn on the LED or LEDs as required. The LED light has a cover (2a) with a plurality of pinholes with such shapes as a star (2e) (2f) (2g) (2i) and moon (2h) to project a shaped image onto the surrounding environment when the LED light beam passes through the plurality of pinholes. The LED light has a front base (2b) and back base (2d) with an empty inner space to fit the above-discussed circuit-means, sensor-means, switch-means, timer-means, IC-means, prong-means etc.

It will be appreciated all these electric components can fit into a "sealed-unit" as described in the following copending applications: (1) U.S. patent application Ser. No. 11/527,631; (2) U.S. patent application Ser. No. 11/498,881; (3) U.S. patent application Ser. No. 11/255,981; (4) U.S. patent application Ser. No. 11/094,215.

The "sealed-unit" may be an "AC sealed unit" that has its own power, LED, circuit-means, and attachment means so that it can fit into any LED light housing that has a uniform compartment. Preferably, the "AC powered sealed unit" includes a 110 Volt 60 Hz or other high voltage connection and is arranged to meet all safety standards to eliminate any hazard of electrical short circuit or possibility of damage during multiple laboratory tests and procedures related to safety certification.

The uniform compartment in the LED light housing has a construction and dimensions so that it is easy to design the "sealed-unit" to fit into this compartment.

The current invention also can use a "DC battery-pack" which has outside dimensions similar that of the "sealed unit" so that it can fit into the "uniform compartment" too. The "DC powered battery-pack" can replace the "AC powered sealed-unit" at any time because both have their own power, LED, circuit-means, and attachment means to fit the same LED light housing as long as it has a uniform compartment.

The current invention can therefore change its power, source from AC to DC or DC to AC if it has a uniform compartment as described above. The "AC power sealed-unit" described in the copending applications listed above not only to saves a lot of tooling for differently-shaped LED lights, but also save a lot of expensive laboratory expense and time for safety testing. Furthermore, the interchangeable power source also can save a lot of tooling cost, time, and labor to provide the LED light having a pinhole-imaging function (or other LED lighting fixture, laser, LED light device, etc.) with the same nice shape but with a different power to use at any location people stay. This is also one of the big advantages of the current invention—not only for all different shapes of LED night light, but also to enable the traditional puck light to be powered either by a DC battery or by AC as long as people pay for the extra parts to plug the traditional puck light into an AC outlet as taught herein.

Figures 3, 4:
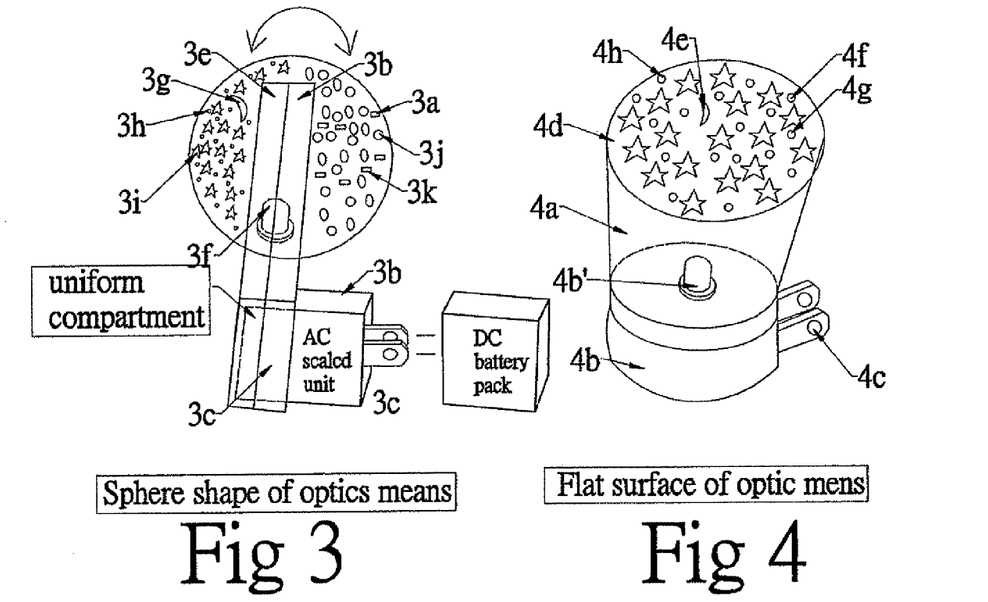
Figure 5:
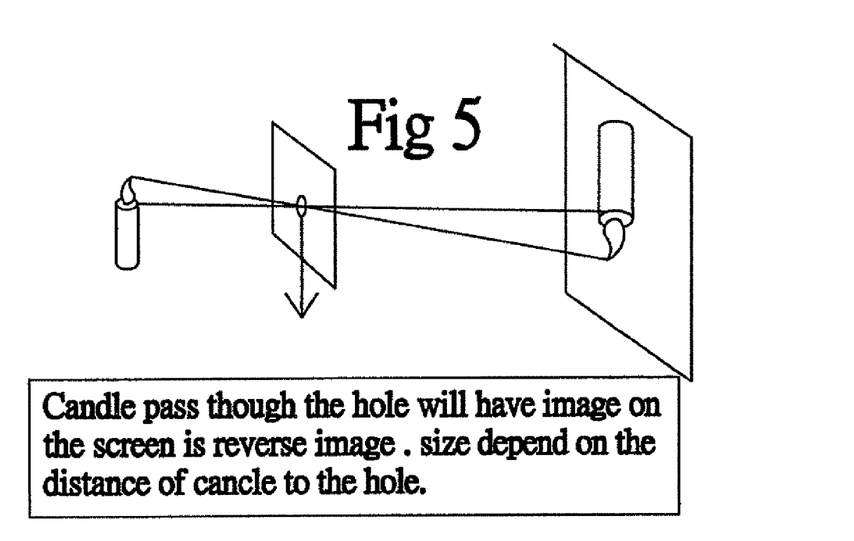
Figure 6:
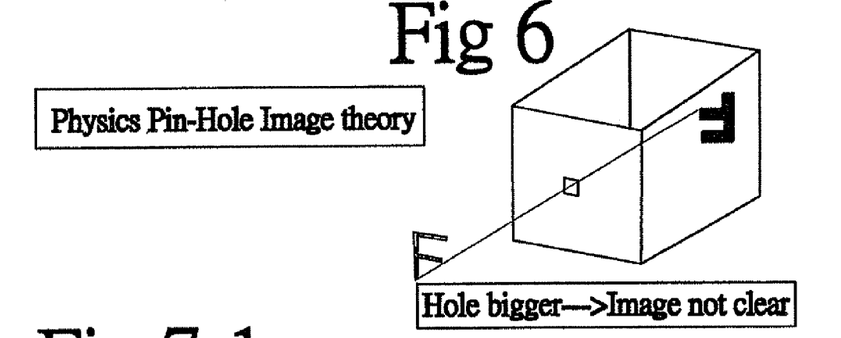
Figure 21:
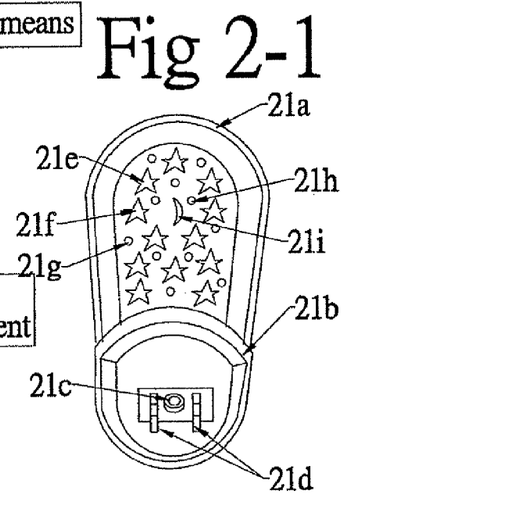
Figure 51:
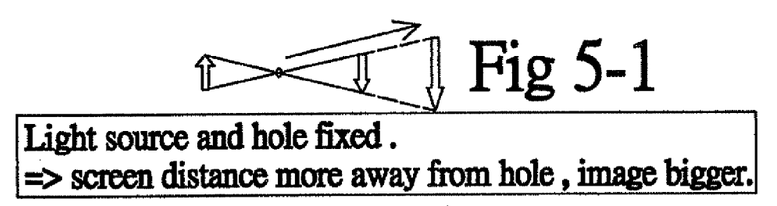
Figure 52:
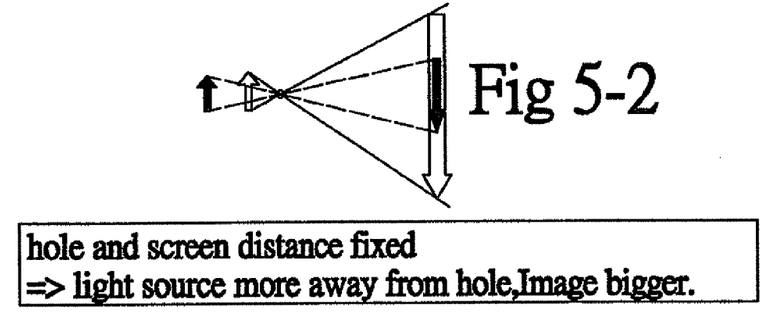
Figure 53:
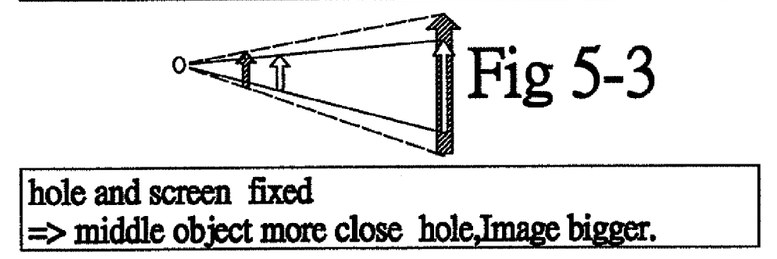
Figure 71:
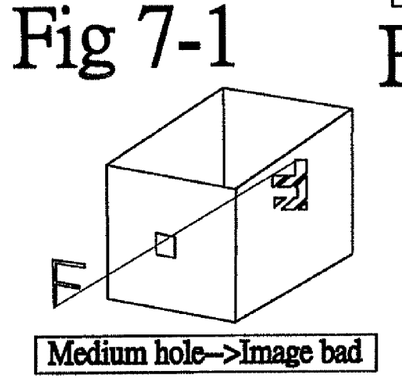
Figure 72:
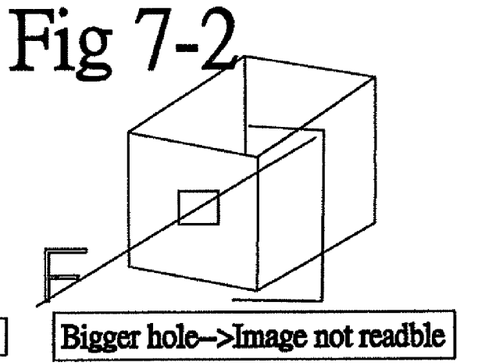

FIG. 2-1 shows the back side of the LED light of FIG. 2. FIG. 3 shows details of the interchangeable power source arrangement for switching between an "AC sealed-unit" and a "DC battery pack." The interchangeable power source could not be used for the prior art because it was difficult to get sufficient brightness from an LED and to find an LED with small enough power consumption to be powered by relatively small size batteries (such as AG-13 or AAA or AA batteries) while lasting for a very long time. Very few people were working on AC and battery powered lights at the same time, so no one noticed the need for interchangeability of power sources.

FIG. 4 shows a fourth preferred embodiment which only projects an image on a ceiling surface so one can make all pinholes in a flast substrate.

FIGS. 5, 5-1, 5-2, 5-3, 6, 7-1, 7-2, 7-3, and FIG. 7-4 principles used by the basic pinhole-imaging arrangement of the invention, such as the relationship between the LED and shaped pinholes required to obtain a desired image size, brightness, distance etc.

Figure 75:
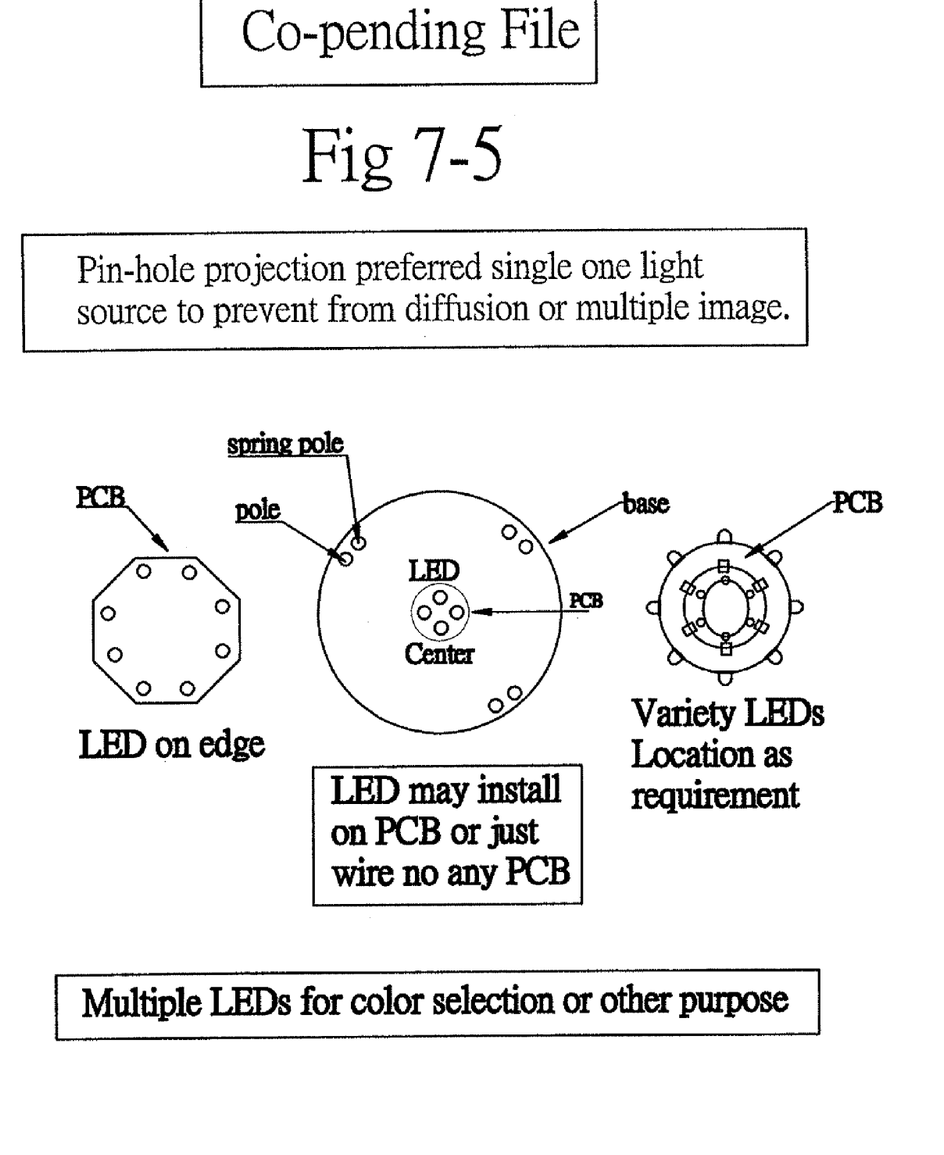
Figure 711:
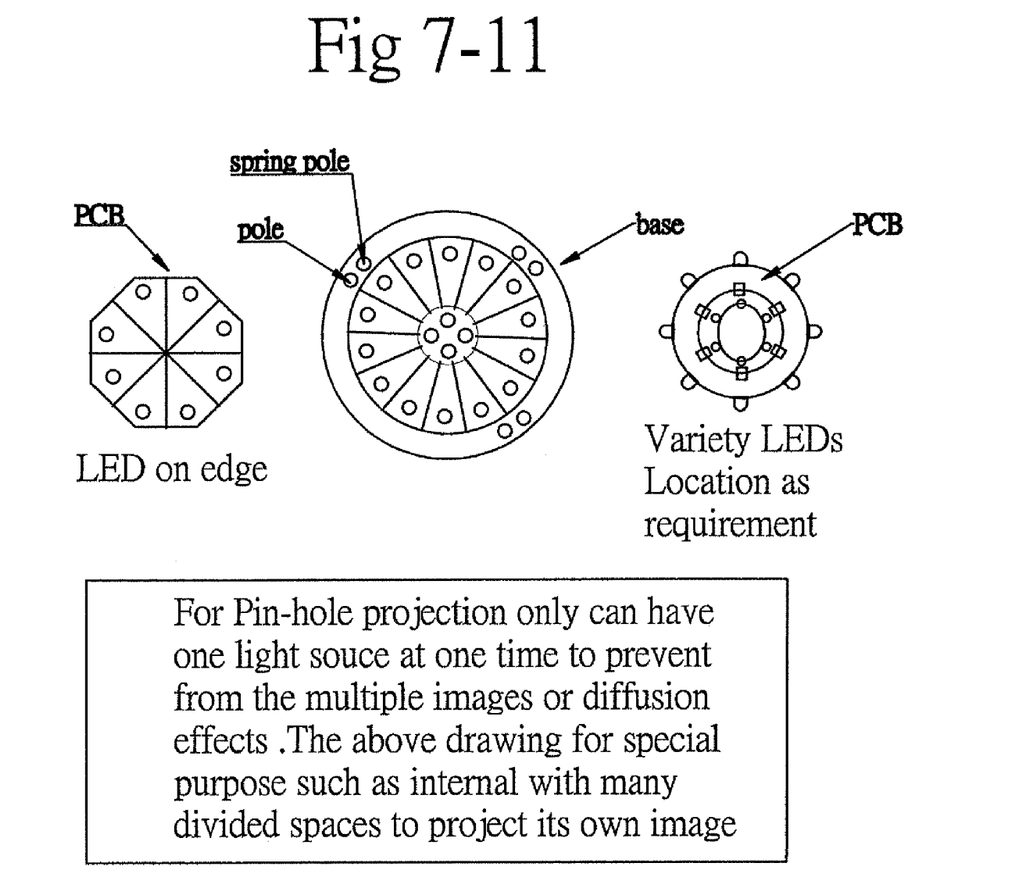

FIGS. 7-5 and 7-11 show a preferred LED arrangement for an LED light. As discussed above, a pinhole-imaging application only can use ONE light source at any time to prevent occurrence of a double or ghost image. The reason a plurality of LEDs are shown is because some applications require different color LEDs for different tastes. FIG. 7-5 shows all these alternative arrangements.

Figures 73, 74:
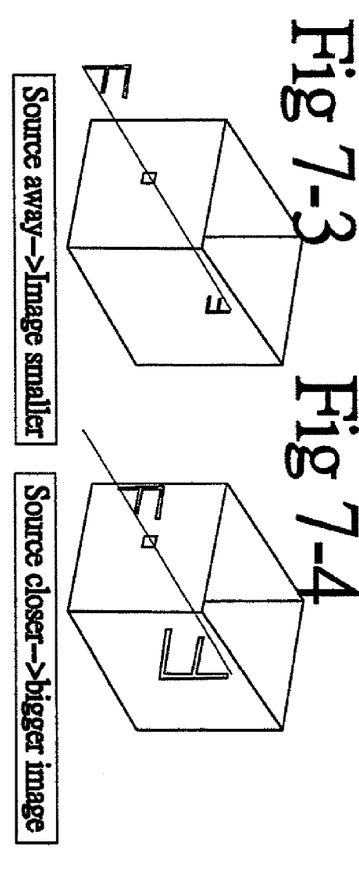
Figure 76:
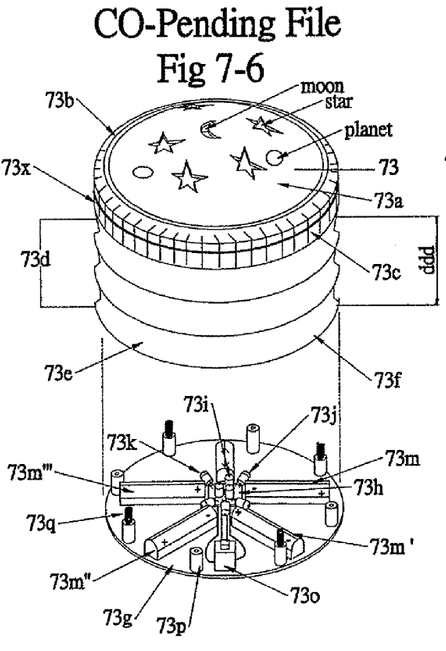

FIGS. 7-6 and 7-7 show different adjust-means to change the distance between the pinholes and light means. Also shown is the preferred LED and power source arrangement used in connection with the adjust-means. As shown in FIG. 7-6, the cover (73a) has a plurality of pinholes shaped for example as stars or a planet or moon to let an LED (73i) light beam pass through and create an image on a desired surface. The foldable-skirt (73d) can change position relative to distance (ddd) to move the pinhole's substrate close to or away from the light source. This will enable the image to be changed between big and small as shown respectively in FIGS. 7-3) and (7-4).

The batteries (73m) (73m') (73m'') (73m''') are arranged in a spiral according to this preferred embodiment with the LEDs arranged within the space defined by the batteries (73K) and the pinholes arranged on the foldable-skirt to cause the LED light beam to pass through the LED light's exterior wall. This is the reason why the LEDs are positioned between the battery connections (73K).

Figure 77:
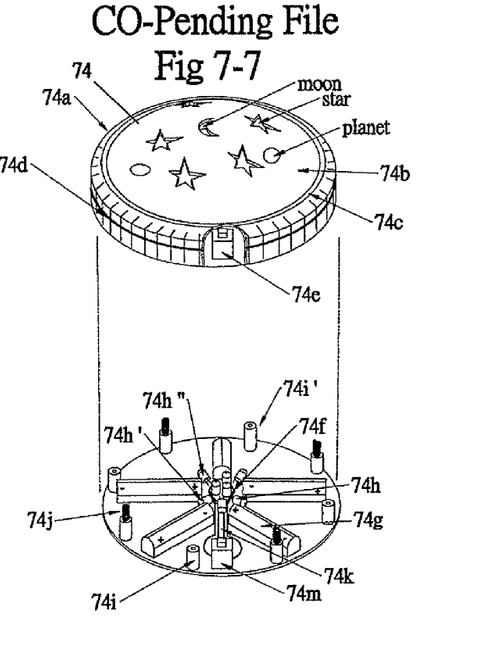

As shown in FIG. 7-7, the cover (74) has a plurality of stars, a moon, and/or a planet(s) to allow the inner LED light beam to pass through and cause an image to be seen on a surrounding surface. The inner switch (74c) is pre-arranged to connect with cover (74) and has elastic-means (74j) to push the cover back after the switch has been pushed. This enables the cover to be used to trigger the LED light for desired illumination (and not just for turn on and turn off—for example, a switch can be arranged to supply a trigger signal to an IC to move the circuit to a next pre-programmed LED status).

Figure 78:
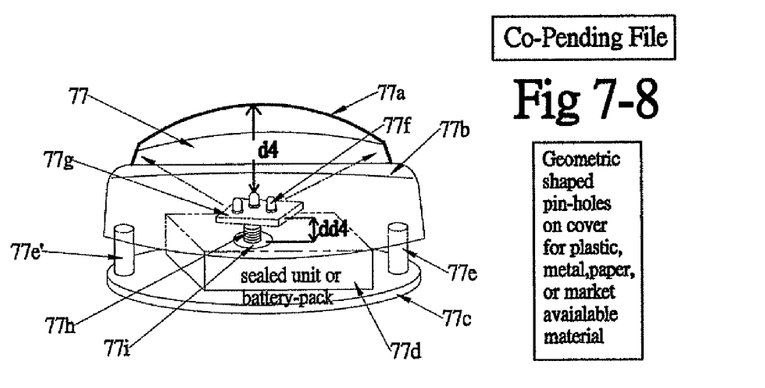
Figure 79:
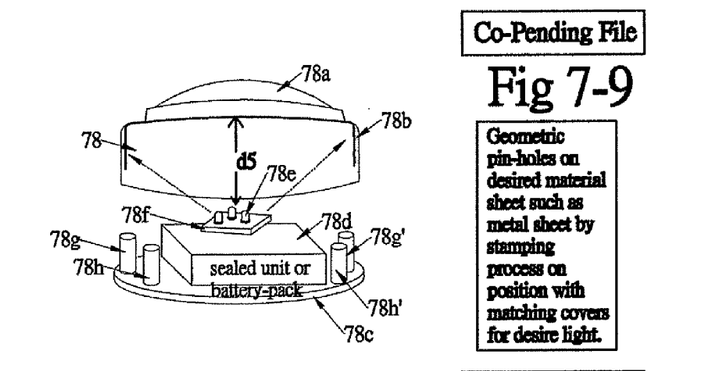
Figure 710:
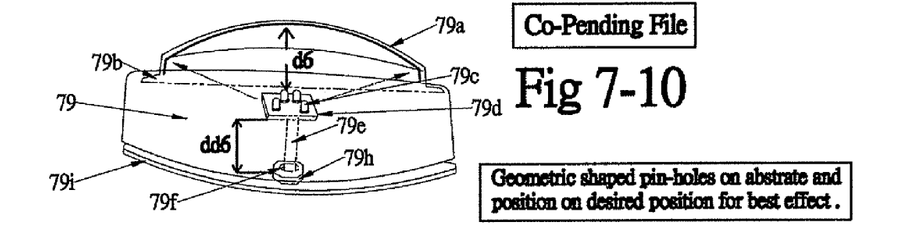

FIGS. 7-8, 7-9, and 7-10 show different substrate materials for pinholes, which may include paper, plastic, metal, wood,
blister or other materials available from the market to easily permit tiny pinholes with a predetermined geometric shape to be formed in its surface and thereby obtain a finished product. These figures also show a power source arrangement capable of being changed from DC to AC or AC to DC. Furthermore, these figures show the effect of the LED light beam path and pinhole-imaging on the size of the image. With respect to the power source interchangeability feature, the DC powered battery-pack can be replaced by the AC powered sealed-unit at any time because the said LED light has the above-mentioned pre-designed uniform compartment. Other details will be apparent by referring to the drawing.

FIGS. 7 to 16 show all kinds of shaped pinhole arrangements on different material substrates on the LED light of the first preferred embodiment's cover or wall. A paper or plastic pinhole-film can also be installed at a desired location to allow the LED light beam to pass through the pinholes and an attractive transparent housing-member to project the image to a surrounding environment, area, or surface.

Figure 7:
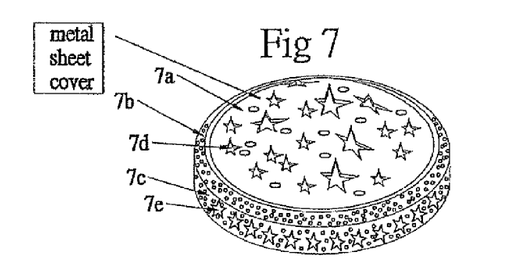
Figure 8:
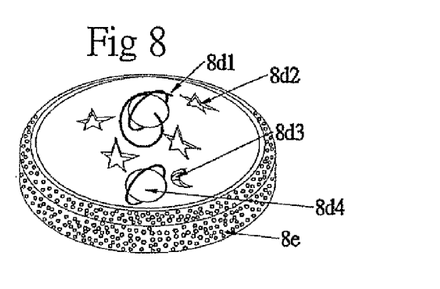

FIGS. 7 and 8 show pinholes formed in a metal sheet, which is desirable because making pinholes in a thin metal sheet by stamping machine is very low cost and can be mass produced very quickly, in contrast to a plastic injection cover in which formation of tiny pinholes takes a long time and the plastic injection tooling is very expensive.

Figure 9:
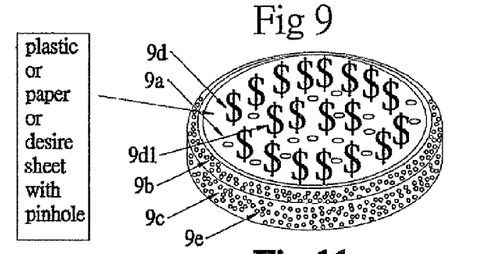
Figure 10:
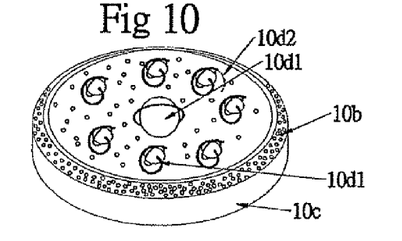

FIGS. 9 and 10 show a method to make a certain message, logo, character, cartoon image, artwork, seasonal wording, nice word, religion image, words, advertisement, or sign by a plurality of tiny pinholes to form the contour of the above mentioned art, design, words, shape, drawing, geometric configuration in a manner similar to that of a conventional LED dot matrix arrangement. Preferably, to provide an acceptable "dot matrix" shape, the pinholes should have a dimension of less than <3 mm+/−50%—the smaller the better. Each geometric shape uses pinholes that are as tiny as possible and as many pinholes as possible so that the shape can be easily recognized and readable by a viewer. The preferred pinhole size (<3 mm+/−50%) is for small room application. If the application is for a larger space, the tiny pinholes can be enlarged to be much bigger. For an indoor bed room application, the best tiny pinhole diameter is below 1 mm (<1 mm), which will provide a very good image on the surrounding environment, including ceiling, walls, or other surfaces.

Figure 11:
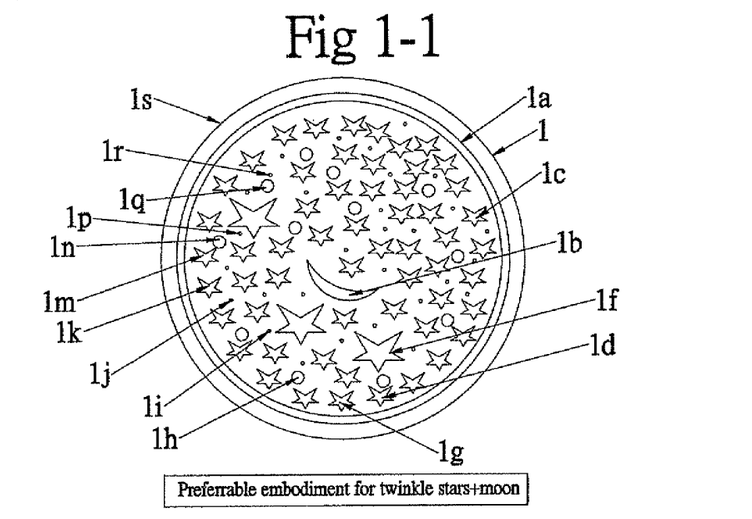

As shown in FIGS. 11 and 12, a pinhole substrate such as plastic sheet can add other optics features such as an opaque holographic film that provides a lot of splendid colors on the plastic sheet (similar to a Visa™ or Master Card™ anti-counterfeiter sticker appearance) so as to increase the current invention's value. A transparent laser or holographic film cannot be used because it will ruin the pinhole-imaging.

Figure 14:
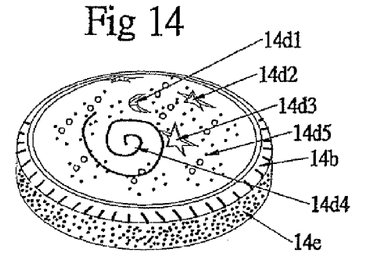

As shown in FIGS. 13 and 14, an economical way to make the pinhole substrate is by using a thicker blister wheet of around 0.5 mm thickness, which is rigid enough to allow people to activate an inner switch by pushing or touching the blister sheet. The tooling to cut out the shaped pinholes is very cheap and easily prepared within a short time. It will also be appreciated that the pinhole substrate's surface for all of the above discussed first through fourth preferred embodiments can have conventional printing, painting, silkscreening, colorful artwork, designs, cartoon characters, signs, logos, and/or drawings thereon to provide an eye-catching effect even while the LED is not turned on.

Figure 15:
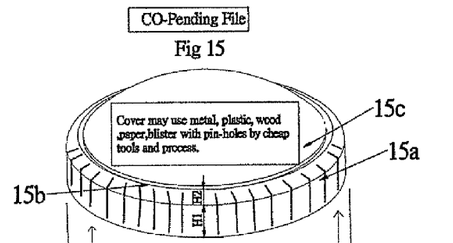
Figure 16:
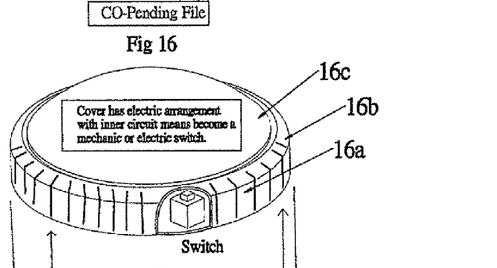
Figure 17:
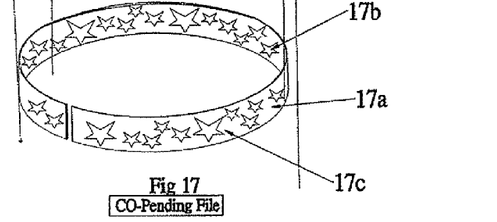
Figure 18:
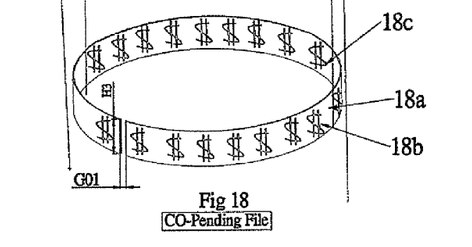

As shown in FIGS. 15 and 16, the pinhole substrate preferably may be a preferred flexible material to serve as wall 360 of the first preferred embodiment (see FIGS. 7 to 14). FIG. 15 shows however that the cover may use metal, plastic, wood, paper, or a blister sheet with pinholes created by a cheap process and tooling. FIG. 16 shows a puck light's cover having an electric arrangement with inner circuit means including a mechanical or electrical switch to activate the LED circuitry by pushing or touching the puck or tap light cover to cause the LED to change its status.

This application also shares details with copending application Ser. No. 12/318,470, entitled "LED projection night light." All of the concepts, drawings, and designs disclosed in the copending application may be used in connection with the current invention, and that all equivalently functional, replaceable, or alternative arrangement may still fall within the scope of the invention.

While the above-discussed and mentioned preferred embodiments are provided to help show the scope of the current invention, they are not intended to be limiting, and it will be appreciated that any alternative or equivalent functions, design, construction, modification, or up-grade may still fall within the scope of the invention, which is not limited to the above discussed and mentioned details. Details that may be varied include, but are not limited to, the power source, conductive means, geometric shape of LED-units, joint-means, circuit means, sensor means, switch means, LED elements, attachment means, fixing-means, tightening means, and resilient conductive means, any of which may have an alternative arrangement, design, or construction.

The invention claimed is:

1. An LED light having a pinhole imaging function, comprising:
   at least one LED arranged to serve as a light source for supplying visible light beams;
   at least one pinhole means formed in a substrate for projecting a desired image, message, data, or logo on a surrounding environment selected from the group including a ceiling, walls, floor, and other surfaces, said LED light further including a housing for said substrate;
   at least one power source and circuit means, said circuit means including a switch arranged to cause the LED to exhibit at least one of a desired light function, timing, color, brightness, and illumination effect,
   the improvement wherein:
   the pinhole means has a plurality of pin-hole arrangements on any one of a plurality of different substrates, said pin-holes including openings, windows made of transparent pieces, or cut-outs in said any one of said plurality of substrates, said pin-holes having a diameter from 0.1 mm to 50 mm (+/−50%) and a distance from the LED to the substrate is from 5 mm to 100 mm (+/−50%), and
   the substrate is arranged to be a switch to turn on said LED when said substrate is touched or pushed by a person, and further to change an illumination status of said LED when said substrate is subsequently touched or pushed by a person,
   wherein the housing is arranged to receive a sealed unit and a battery pack that each includes said power source and corresponding said circuit means, said sealed unit and battery pack being interchangeable.

2. The LED light having a pinhole imaging function as claimed in claim 1, wherein said substrate is selected from the group consisting of paper, plastic, metal, wood, and a blister material.

3. The LED light having a pinhole imaging function as claimed in claim 2, wherein said substrate further includes added decoration selected from the group consisting of silk-screening, metallization, a chrome finish, a coating, and painting.

4. The LED light having a pinhole imaging function as claimed in claim 1, wherein a plurality of said pinholes are arranged to form a message, logo, display, word, seasonal wording, advertisement, sign characters, or a cartoon.

5. The LED light having a pinhole imaging function as claimed in claim 1, further comprising adjustment means for changing a position of the LED relative to the substrate including said pinholes.

6. The LED light having a pinhole imaging function as claimed in claim 1, wherein a dimension of said housing is less than 15 cm and a distance between the LED and said substrate in which said pinhole imaging means is formed is between 2 cm and 10 cm (+/−50%).

7. The LED light having a pinhole imaging function as claimed in claim 1, wherein the at least one LED includes a plurality of differently colored LEDs controlled by an IC to change a color output of the at least one LED, either by changing colors or by changing from a single color mode to automatic color-changing mode, when an area of said housing is touched or pushed by a person.

8. The LED light having a pinhole imaging function as claimed in claim 1, wherein a viewing angle of the LED is between 60 degrees and 180 degrees.

9. The LED light having a pinhole imaging function as claimed in claim 1, wherein said substrate includes multiple pinhole sections with different pinhole arrangements to change a projected image upon rotating or adjusting a position or orientation of the substrate material.

10. An LED light having a pinhole imaging function, comprising:
    at least one LED arranged to serve as a light source for supplying visible light beams; at least one pinhole means formed in a substrate for projecting a desired image, message, data, or logo on a surrounding environment selected from the group including a ceiling, walls, floor, and other surfaces, said LED light further including a housing for said substrate;
    at least one power source and circuit means, said circuit means including a switch arranged to cause the LED to exhibit at least one of a desired light function, timing, color, brightness, and illumination effect,
    the improvement wherein:
    the pinhole means has a plurality of pin-hole arrangements on any one of a plurality of different substrates, said pin-holes including openings, windows made of transparent pieces, or cut-outs in said any one of said plurality of substrates, said pin-holes having a diameter from 0.1 mm to 50 mm (+/−50%) and a distance from the LED to the substrate is from 5 mm to 100 mm (+/−50%), and
    the housing has a space that includes an inner circuit means including a switch for causing said circuit means to change an illumination status of said LED when said housing is touched or pushed by a person.

* * * * *